United States Patent
Andreas et al.

(10) Patent No.: US 7,403,304 B2
(45) Date of Patent: Jul. 22, 2008

(54) METHOD FOR OPTIMISED COLOUR REPRODUCTION OF A COLOURED ORIGINAL IMAGE

(75) Inventors: Paul Andreas, Vaterstetten (DE); Benno Petschik, Markt Schwaben (DE)

(73) Assignee: Oce Printing Systems GmbH, Poing (DE)

( * ) Notice: Subject to any disclaimer, the term of this patent is extended or adjusted under 35 U.S.C. 154(b) by 400 days.

(21) Appl. No.: 10/527,475

(22) PCT Filed: Sep. 10, 2003

(86) PCT No.: PCT/EP03/10045

§ 371 (c)(1),
(2), (4) Date: Aug. 11, 2005

(87) PCT Pub. No.: WO2004/030344

PCT Pub. Date: Apr. 8, 2004

(65) Prior Publication Data

US 2006/0096483 A1   May 11, 2006

(30) Foreign Application Priority Data

Sep. 19, 2002 (DE) ................................ 102 43 554

(51) Int. Cl.
*G03F 3/08* (2006.01)
*G06F 15/00* (2006.01)

(52) U.S. Cl. .......................... 358/1.9; 358/518; 358/520

(58) Field of Classification Search .................. 358/1.9, 358/518, 520, 523, 524; 382/162, 166, 167
See application file for complete search history.

(56) References Cited

U.S. PATENT DOCUMENTS 5,933,253 A   8/1999   Ito et al.
5,949,427 A   9/1999   Nishikawa et al.

(Continued)

FOREIGN PATENT DOCUMENTS

DE   36 09 049    2/1990
DE   199 46 585   4/2001

OTHER PUBLICATIONS

Eighth Color Imaging Conference: Color Science and Engineering Systems, Technologies, Applications Nov. 7-10, 2000 The SunBurst Resort IS&T.

(Continued)

*Primary Examiner*—Kimberly A Williams
(74) *Attorney, Agent, or Firm*—Schiff Hardin LLP

(57) ABSTRACT

A method is provided for optimized color reproduction of a color original image by a color reproduction device. Color values of a color space of the original image are determined. A color space of the color reproduction device is determined. The color spaces of the original image and of the color reproduction device are compared and it is established which color range of the original image cannot be reproduced by the color reproduction device. Via a color adaption method, an adaption of the non-reproducible color range of the original image, and of a boundary range bordering this non-reproducible color range, to the color space of the color reproduction device is provided. Then an image-specific color association is generated. The original image is output by the image reproduction device according to the image-specific color association.

10 Claims, 5 Drawing Sheets

U.S. PATENT DOCUMENTS

| | | | |
|---|---|---|---|
| 5,987,165 | A | 11/1999 | Matsuzaki et al. |
| 6,023,527 | A * | 2/2000 | Narahara .................... 358/520 |
| 6,151,136 | A | 11/2000 | Takemoto |
| 6,281,984 | B1 | 8/2001 | Decker et al. |
| 6,384,836 | B1 * | 5/2002 | Naylor et al. ................ 345/589 |
| 6,611,356 | B1 * | 8/2003 | Shimizu et al. .............. 358/1.9 |
| 6,763,135 | B1 * | 7/2004 | Tohyama et al. ............ 382/167 |
| 2001/0017627 | A1 * | 8/2001 | Marsden et al. ............. 345/501 |
| 2004/0061881 | A1 * | 4/2004 | Shimizu et al. .............. 358/1.9 |

OTHER PUBLICATIONS

A Topographic Gamut Mapping Algorithum Based on Experimental Observer Data Copyright 2000, IS&T, Lindsay MacDonald et al.

Gamut Mapping using Color-Categorical Weighting Method—Motomura Copyright 2000.

* cited by examiner

METHOD FOR OPTIMISED COLOUR REPRODUCTION OF A COLOURED ORIGINAL IMAGE

BACKGROUND

Various color systems (U.S. Pat. No. 6,281,984 B1) are used for color specification in image processing and image reproduction (for example on a monitor or a printer). While input devices (for example scanners) predominantly designate colors via RGB, knowledge of the area coverage degree of the primary colors (mostly CMYK) is necessary for color reproduction devices. However, other color reproduction devices such as monitors also use RGB for color specification.

This problem is explained using FIG. 1. An original image BV is, for example, shown in a first color system (for example RGB) with a scanner SC. The RGB image values for the original image BV are, for example, translated into CIE-LAB image values. The original image should now be output by a color reproduction device, a printer as an example. The printer operates in a second color system, for example CMYK. The CIE-LAB color values are correspondingly translated into the color system CMYK. The printer WG can now print the original image as BV'.

All of these color specifications are device-dependent, i.e., for example, the same RGB values of two different scanners or scanner and monitor, describe different colors. This device dependency has been known for a long time. In order to enable a correct color communication between the various devices, a conversion of the device-dependent color specification into a device-independent color system (for example CIELAB) is therefore frequently effected. For this conversion, the color values are typically determined with a color measurement device and associated with the device-dependent color specification (RGB, CMYK). One possibility of such a color association is the creation of tables, as this is implemented in the color profiles according to the ICC International COLOR Consortium (address: www.Color.org). Such color profiles are also specified in DE 199 46 585 A1. However, it is just as conceivable to use functions instead of tables to specify the color association. Color association is discussed in the following for a conversion rule of color specifications, for example between device color specification and an arbitrary color specification (for example CIELAB).

What is problematic is that color reproduction devices can in principle not cover the optimal color space, but rather are limited to more or less sizable color ranges. Therefore colors that are not reproducible by the color reproduction device are modified in the color conversion. There are various possibilities for this color adaptation. This, for example, given color management according to ICC, four variants of the color association tables are already established by default. For the most part it is attempted to obtain an optimally similar image impression given color images; this color adaptation is called "perceptual" in ICC. Not only are the colors that are not achieved by the respective color reproduction device thereby changed, but rather also those colors lie in the boundary range of the achievable color space. This is necessary in order to obtain a gradation between various colors.

FIG. 2 shows these relationships. Shown there in an xy-graphic (as a part of ClExyY) over the color norm portion x, y is the theoretical optimal maximal color space FR (unbroken curve) and the color space FR-WG (dot-dash curve) achievable by a color reproduction device, for example a printer. Colors are additionally specified as an example. When the color space achievable by an original image is greater than the color space achievable by an original image, a color space adaptation occurs (shown by unbroken arrows). The colors outside of the color space of the color reproduction device are thereby shifted into the color space of the color reproduction device. This compression occurs for all colors lying outside of the color space of the color reproduction device, but also for colors lying within the color space of the color reproduction device in order to obtain the color gradation explained above.

Many methods of color space adaptation are known. A few examples are found in the IS&T Proceedings of the Eighth Color Imaging Conference, 2000-11-07 through 2000-11-10 in USA, Arizona, Phoenix, Scottsdale, SunBurst Hotel.

L. MacDonald, J. Morovic, K. Xiado: Topographic Gamut Mapping Algorithm Based on Experimental Observer Data; IS&T Proceedings of the Eighth Color Imaging. Conference, 2000-1107 through 2000-11-10 in USA, Arizona, Phoenix, Scottsdale, SunBurst Hotel H. Motomura: Gamut Mapping Using Color-Categorical Weighting Method, IS&T Proceedings, Eighth Color Imaging Conference, 2000-11-07, Scottsdale.

In the known methods, such a color association for each created image is independent for each color reproduction device. This means that all theoretically possible colors must be mapped in the color space of the color reproduction device. However, this also leads to colors that lie within the reproducible color space having to be significantly changed and reduced in terms of their saturation. Given images that do not completely cover this theoretical optimal color space, this leads to an unnecessary modification of the colors of the image. As a rule, given color images only a limited color space is necessary, such that most images are unnecessarily significantly changed.

The conversion of color information ensures that color specifications exist that can be traced over the entire color transfer process. This color value conversion thereby must be determined for each individual device (or device class) and also for different transfer settings (brightness setting on the monitor, paper grade in the printer, etc.). According to methods typical today, this is implemented one time for each device state used.

SUMMARY

It is an object to specify a method with which original images can be reproduced optimally fast with a color reproduction device. Designated with "original image" here are all color images that should be output by a color reproduction device, independent of their origin. For example, an original image can be a photo that has been scanned or a color image directly generated by a computer. The original image stored in a computer can thus already have been reproduced multiple times.

A method is provided for optimized color reproduction of a color original image by a color reproduction device. Color values of a color space of the original image are determined. A color space of the color reproduction device is determined. The color spaces of the original image and of the color reproduction device are compared and it is established which color range of the original image cannot be reproduced by the color reproduction device. Via a color adaption method, an adaption of the non-reproducible color range of the original image, and of a boundary range bordering this non-reproducible color range, to the color space of the color reproduction device is provided. Then an image-specific color association is generated. The original image is output by the image reproduction device according to the image-specific color association.

DESCRIPTION OF THE PREFERRED EMBODIMENT

Figure 1:
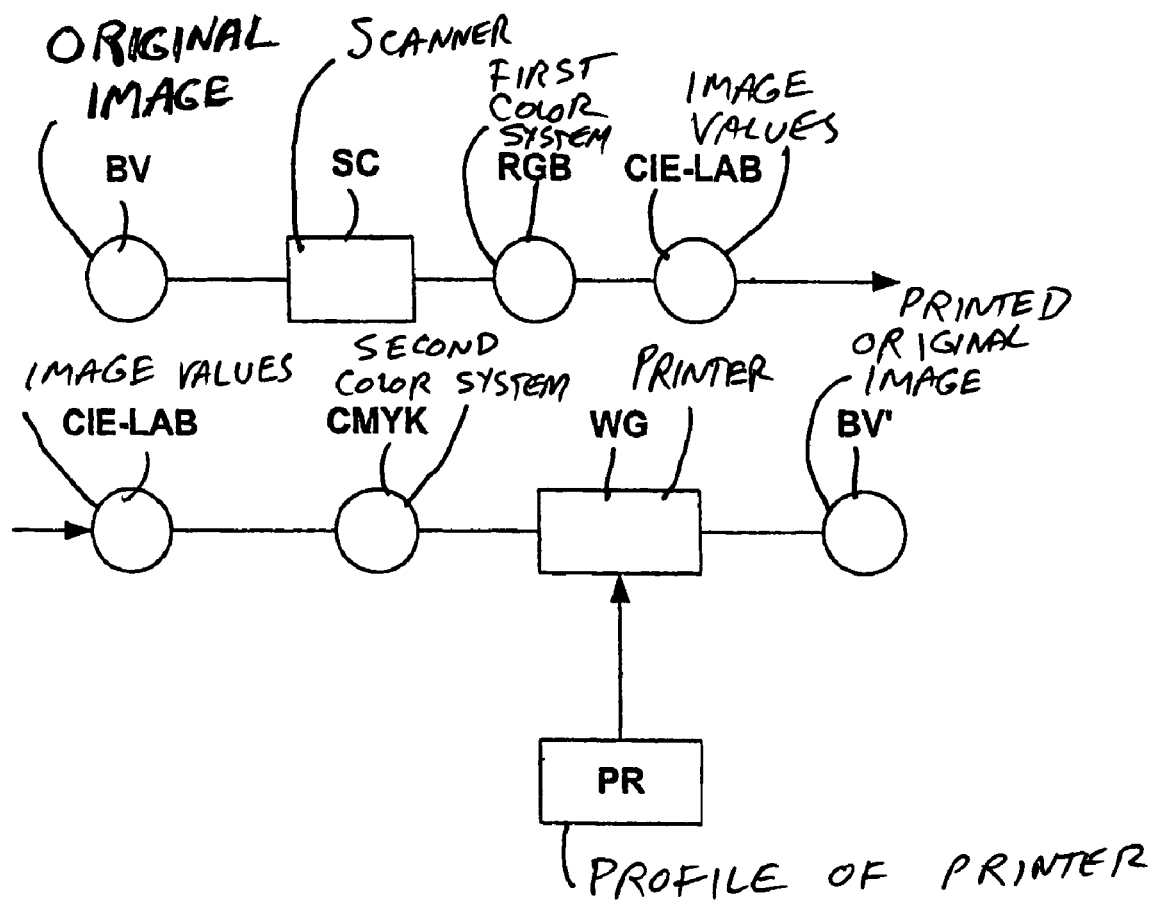
FIG. 1 is an illustration of an original image where transformations occur in color spaces prior to a printer printing out the original image.
Figure 2:
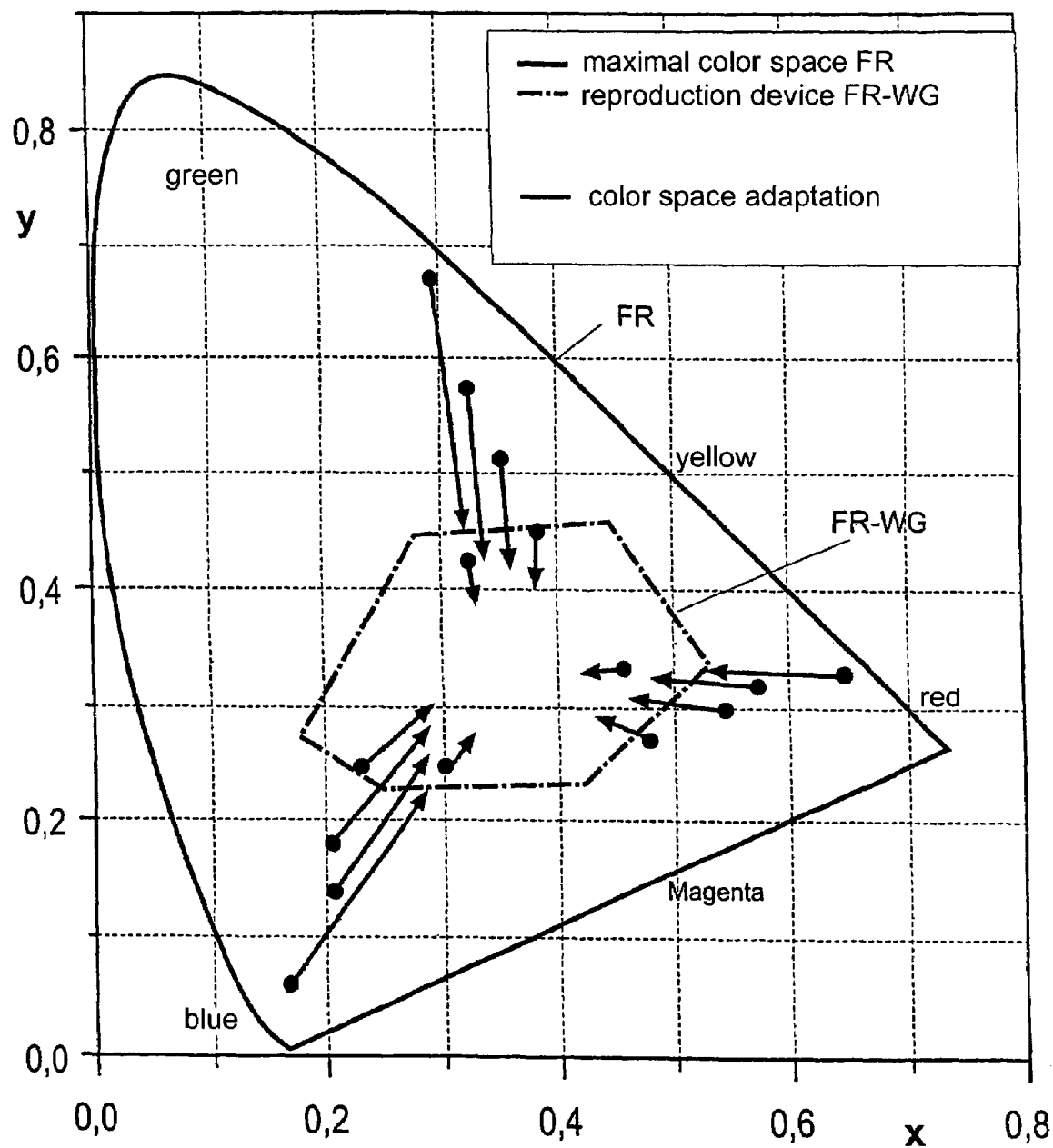
FIG. 2 is a diagram illustrating color space relationships.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

A color association for the color reproduction device is generated with the preferred embodiment, dependent on the original image to be output. The reproduction properties of the color reproduction device are determined via test outputs, as before. A typical correction of the measurement data thereby acquired (averaging, modification of the sampling points) can also be implemented. However, a color space adaptation still does not occur. The necessary color space of the original image is created beforehand, in that the occurring colors are analyzed. This color space information of the original image can also be generated beforehand in the creation of the original image. Only when it has been clarified how the original image should be output, thus for example the color reproduction device, print substrate, settings etc. are set, is the individual color association created between the color values of the original image and of the color reproduction device (mostly in CMYK when the color reproduction device is a printer). This color association then forms the profile of the color reproduction, which can be stored in table form or the color space conversion function.

An advantage of the method of the preferred embodiment thus lies in that the color space adaptation is different dependent on the original image, thus only so much as is necessary for the respective original image is modified by color space adaptation. An improvement of the color reproduction, an increase of the brilliance of the images, a reduction of the color errors in comparison with the original image, and an improved color adaptation with various print substrates thus result.

The method of the preferred embodiment is particularly advantageous for the creation of "proofs" (=test prints, in which the appearance of the image is simulated given output on the device to be tested). When proof devices (special digital proofers, monitors, etc.) do not completely comprise the color space of the color reproduction device to be adjusted, the proof errors can be reduced to the unavoidable minimum with the specified method. Given many motifs, the possibility simultaneously opens up to get by with proof devices that exhibit a relatively small color space.

Figure 3:
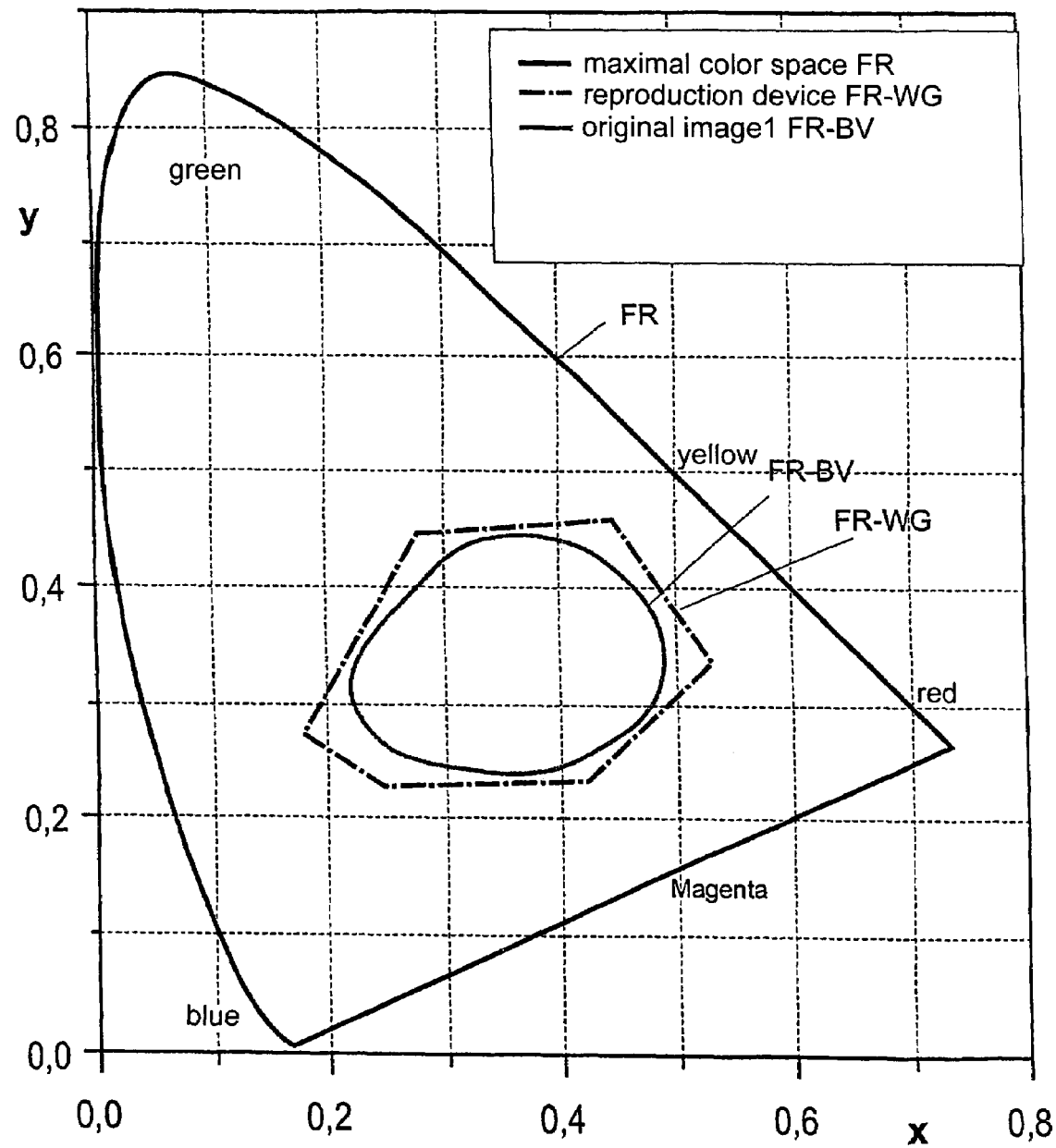
FIG. 3 is a representation of the color spaces of an original image and a color reproduction device for the case that the original image completely falls in the color space of the color reproduction device.

In FIG. 3, an example is shown in which the color space FR-WG of the color reproduction device completely comprises the color space FR-BV of the original image BV1, i.e. the color reproduction device can generate all colors contained in the original image BV1. A color space compression in the original image is not necessary for this case.

Figure 4:
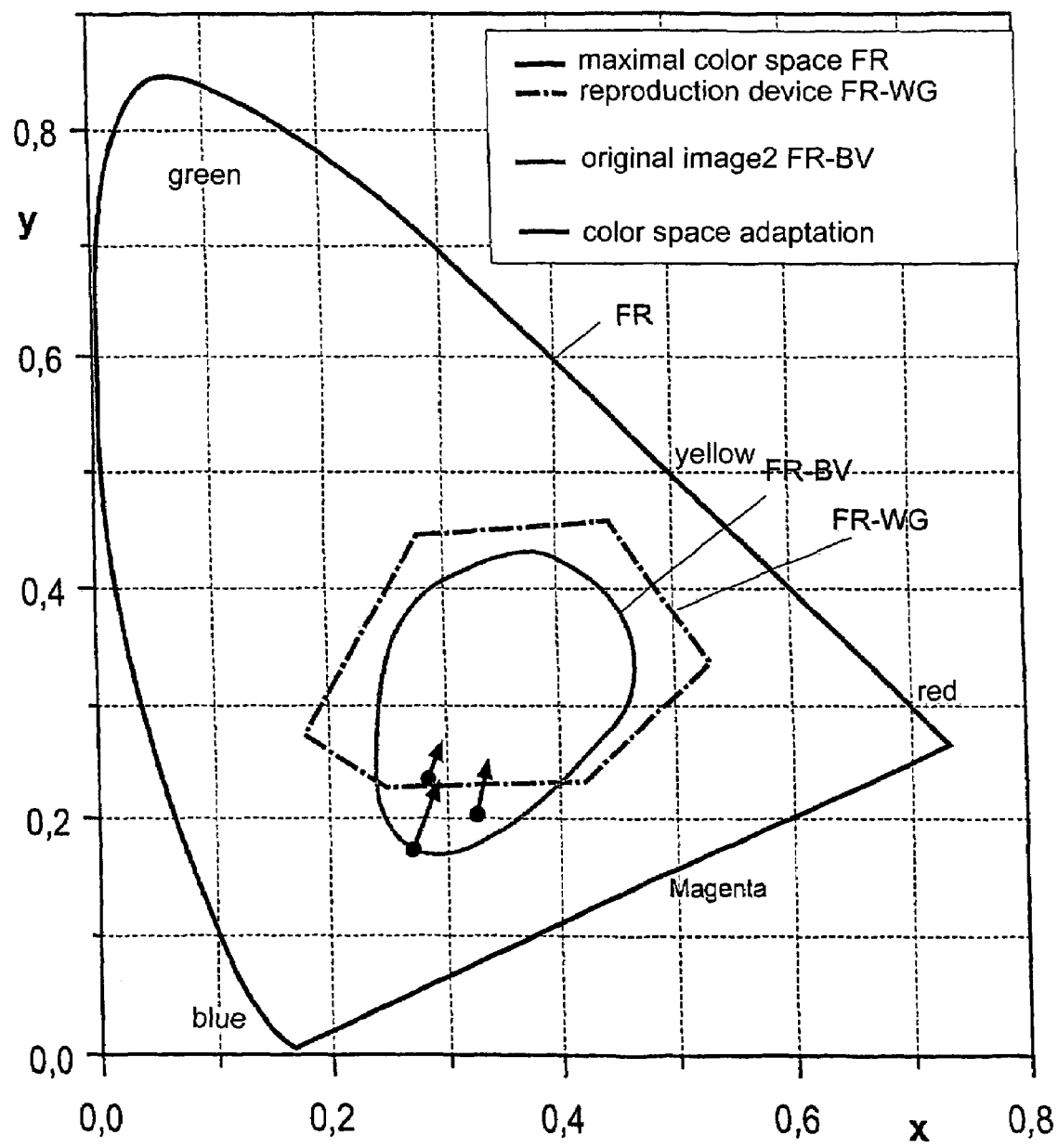
FIG. 4 is a representation of the color spaces of an original image and a color reproduction device for the case that the original image does not completely fall in the color space of the color reproduction device.

In contrast to this, in FIG. 4 the original image BV2 comprises colors that do not fall in the color space FR-WG of the color reproduction device WG. For example, the blue tones of the original image BV2 cannot be reproduced. A color space compression is therefore only necessary in the blue range. No color adaptation is implemented with the remaining colors.

Figure 5:
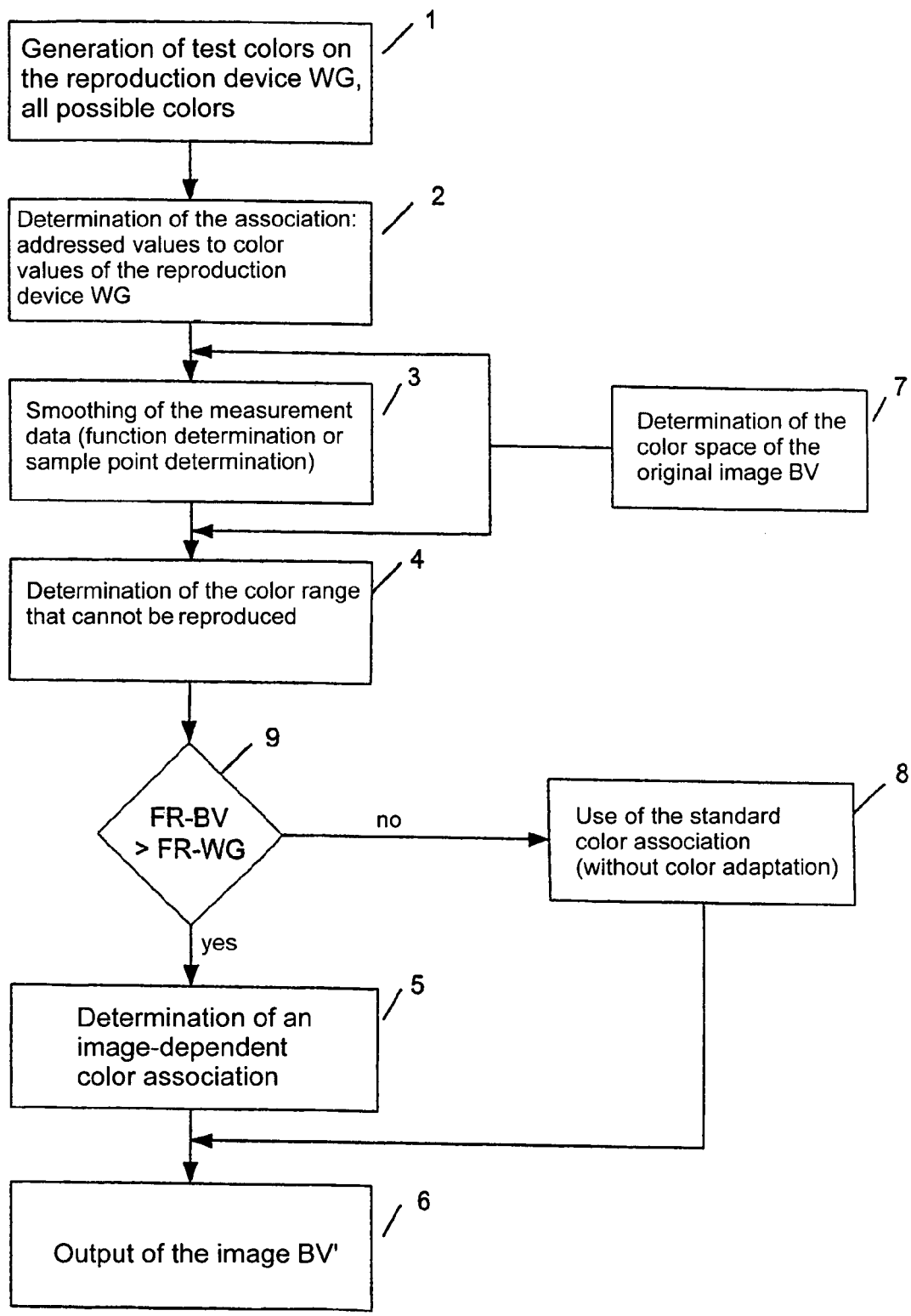
FIG. 5 is a diagram that shows the workflow of the method.

The workflow of the method can be learned from FIG. 5. The color space that can be achieved by the color reproduction device WG is initially established (step 1). This occurs in a known manner, in that all possible colors (test colors) are output (for example are printed) and then are measured. The association of the addressed color values with the color values of the color reproduction device is subsequently established (step 2). The measurement data can be smoothed in a known manner in step 3. In step 4, the color range that cannot be reproduced by the color reproduction device WG is determined using the color space of the original image BV, which is determined in step 7. In step 9 it is tested whether the color space FR-BV of the original image is larger than the color space FR-WG of the color reproduction device. If the color space of the color reproduction device completely covers the color space of the original image, a standard color conversion can be loaded without color space compression (step 8). This image-independent color conversion is created once beforehand for the color reproduction device in the desired state (for example print substrate). Otherwise the image-dependent color association (for example the image-dependent profile) for the color reproduction device is created in step 5. As specified above, the non-reproducible color range is thereby optimally adapted to the color space of the color reproduction device with a color adaptation method. The original image can henceforth be printed out as an image BV', corresponding to this color association (step 6).

The method is particularly advantageous when a printer, in particular an electrophotographic printer, is used as a color reproduction device.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for optimized color reproduction of a color original image by a color reproduction device, comprising the steps of:

determining color values of a color space of the original image;

determining a color space of the color reproduction device;

comparing the color spaces of the original image and of the color reproduction device and establishing which color range of the original image cannot be reproduced by the color reproduction device;

via a color adaptation method, the color range of the original image which cannot be reproduced is adapted to the color space of the color reproduction device by adapting colors inside the color reproduction device color space which correspond to colors in said color range of said original image which cannot be reproduced, but without adapting remaining colors in said reproduction device color space, and then generating an image-specific color association; and outputting the original image by the image reproduction device according to the image-specific color association.

2. A method according to claim 1 wherein for creation of the image-specific color association, an adaptation of the color space of the original image to that of the image reproduction device occurs when the color space of the original image does not lie within the color space of the color reproduction device.

3. A method according to claim 2 wherein an image-independent standard color association is loaded when the color space of the color reproduction device covers the color space of the original image.

4. A method according to claim 3 wherein the standard color association comprises the color association characterizing the color transfer properties of the color reproduction device.

5. A method according to claim 1 wherein for the color adaption method the color values necessary for the adaption method are smoothed.

6. A method according to claim 1 wherein the color association is stored in a table as a profile of the color reproduction.

7. A method according to claim 1 wherein the color association is stored as a function.

8. A method according to claim 1 wherein the color reproduction device comprises a printer.

9. A method according to claim 8 wherein the printer comprises an electrophotographic printer.

10. A method according to claim 1 wherein the output original image comprises a proof which is output in a proof device.

* * * * *